(12) United States Patent
Ronge et al.

(10) Patent No.: US 6,467,524 B2
(45) Date of Patent: Oct. 22, 2002

(54) TIRE FILING METHOD AND APPARATUS ADAPTABLE TO DIFFERENT SIZES OF TIRES

(75) Inventors: Heinz Ronge, Muehltal; Martin Rogalla, Eberstadt; Georg Lipponer, Zwingenberg, all of (DE)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 09/782,267

(22) Filed: Feb. 12, 2001

(65) Prior Publication Data

US 2001/0013396 A1 Aug. 16, 2001

(30) Foreign Application Priority Data

Feb. 16, 2000 (DE) .......................................... 100 07 019

(51) Int. Cl.⁷ ............................................. B60C 25/132
(52) U.S. Cl. ........................ 157/1.17; 157/1; 157/1.2; 137/223; 141/38
(58) Field of Search ..................... 137/223; 141/38; 157/1, 1.1, 1.17, 1.2, 1.28

(56) References Cited

U.S. PATENT DOCUMENTS

| | | | | |
|---|---|---|---|---|
| 2,900,015 A | * | 8/1959 | Harrison ..................... | 157/1.1 |
| 3,978,903 A | * | 9/1976 | Mueller et al. ............... | 157/1.2 |
| 4,735,250 A | * | 4/1988 | Kane ........................... | 157/1.1 |
| 4,947,919 A | * | 8/1990 | Timlin ...................... | 157/1.1 X |
| 5,035,274 A | * | 7/1991 | Kinnick et al. ............... | 157/1.1 |
| 5,146,969 A | * | 9/1992 | Kawabe et al. ............... | 157/1.1 |
| 6,029,716 A | * | 2/2000 | Hawk ........................... | 141/38 |

FOREIGN PATENT DOCUMENTS

| | | |
|---|---|---|
| DE | 1912722 | 12/1970 |
| DE | 3423307 | 1/1986 |

* cited by examiner

Primary Examiner—James G. Smith
(74) Attorney, Agent, or Firm—W. F. Fasse; W. G. Fasse

(57) ABSTRACT

A pneumatic tire filling station includes a support and seal arrangement on which one side wall of the tire is supported and sealed, and a tire filling bell that presses and seals against the opposite side wall of the tire and then supplies pressurized air into the tire. The filling bell includes outer and inner rings that are concentrically slidable relative to each other. One of the rings is selected for the filling operation depending on the size of the tire. The support and seal arrangement includes plural plate members that are joined and sealed together to form a continuous support and seal surface, or moved laterally apart to allow a transport apparatus to carry and support the mounted tire from underneath. The tire filling station is adaptable to different models and sizes of mounted tires even in a mixed process flow, in an automated manner.

21 Claims, 3 Drawing Sheets ously
TIRE FILING METHOD AND APPARATUS ADAPTABLE TO DIFFERENT SIZES OF TIRES

This application is based on and claims the priority under 35 U.S.C. §119 of German Patent Application 100 07 019.1, filed on Feb. 16, 2000, the entire disclosure of which is incorporated herein by reference.

FIELD OF THE INVENTION

The invention relates to a tire filling station for filling pneumatic tires such as a motor vehicle tire in the form of a wheel/tire combination comprising a tire mounted on a wheel rim. The tire filling station includes a transport apparatus that transports the wheel/tire combination to a filling stand, including a tire filling dome or bell and an oppositely arranged support and seal arrangement, as well as means for moving at least one of the wheel/tire combination and the transport apparatus relative to each other in a direction perpendicular to the transport plane. A respective wheel/tire combination is received between the tire filling bell and the support and seal arrangement, which respectively contact and cooperate with the outer side walls of the tire, so as to fill air into the tire through an annular gap between the tire bead and the wheel rim.

BACKGROUND INFORMATION

In the high volume series production of motor vehicles on an assembly line, wheel rims and tires are respectively transported from different warehouse or supply locations by means of suitable transport apparatus, to a tire mounting production line, in which a respective tire is mounted on a respective wheel rim and then pressurized air is filled into the mounted tire at the desired tire air pressure. Next, the wheel/tire combination that has been produced in this manner is generally tested for its running characteristics or unbalance condition, and is generally also subjected to a balancing operation. The finished wheel/tire combination is then delivered from the tire production line to the assembly line for the complete motor vehicle, where the respective wheel/tire combinations are mounted on the motor vehicles.

A conventional tire filling station of the above mentioned general type is disclosed in U. S. Pat. No. 4,947,919. The conventional tire mounting and filling system according to this U. S. Patent essentially comprises a mounting station, a transport apparatus, and a tire filling station. In the mounting station, the tire is mounted on the wheel rim, and this combination is then transported in a pressure-less condition to the tire filling station by the transport apparatus. The transport apparatus comprises two chains on which the tire sidewalls of the wheel/tire combinations are supported. In the tire filling station, the transport apparatus is lowered or dipped down so that the respective wheel/tire combination comes to rest with its downwardly-facing side wall surface on a support plate.

In the arrangement shown in FIG. 5 of the above U. S. Patent, a tire filling bell or dome is arranged above the opposite or upwardly-facing side of the wheel/tire combination. In order to carry out the tire filling process, the tire filling bell is lowered, until the rim thereof presses the tire sidewall away from the wheel rim so as to form an annular gap or space between the tire side wall bead and the wheel rim. Then, the pressurized air filling of the tire is carried out through this annular gap. To achieve this, pressurized air flows from a pressurized air source through air passages in the support plate, through the sealed wheel rim inner space into the tire filling bell, and from there through the annular gap into the inner space of the tire. As the air pressure builds up within the tire, the air pressure inflates or expands the tire, whereby the air pressure pushes the tire sidewall and particularly the tire sidewall bead into sealing contact with the tire rim, while closing the above mentioned annular gap.

The above described conventional tire filling station is not suitable for use in tire mounting production lines in which wheels having respective wheel rims and/or tires of greatly varying sizes are to be mounted. In other words, such a known tire filling station is not readily adaptable for filling wheel/tire combinations of greatly differing sizes in succession, but instead is generally only suitable for the series production of a single size of wheel/tire combinations. Particularly, the capacity of the known tire filling station to handle wheel/tire combinations of different diameters is limited because the diameter of the support plate is limited or confined by the dimensions of the transport apparatus. Also, the size capacity of the known tire filling station is limited by the diameter of the tire filling bell. For these reasons, wheel/tire combinations having a larger diameter than intended for the respective tire filling station cannot easily be mounted or filled on such a tire filling station.

If the tire filling bell of the known filling station is equipped with a seal ring to seal against the side of the wheel rim during the filling operation, the filling station suffers the following additional disadvantages. The seal ring is subject to wear and damage, so that it requires a high degree of monitoring and maintenance. Wheel rims having any degree of running deviation of the lip or edge of the wheel rim can be crushed or bent by the seal ring pressing thereagainst. Especially when a seal ring is used in connection with wheel rims of present-day modern design, in which the major wall or bowl of the rim protrudes laterally outwardly beyond the rim lip, the seal ring will improperly contact the protruding bowl wall of the wheel rim at an angle relative to the wheel rim lip. For these reasons, it has been found in practice that such a tire filling bell has very little flexibility or adaptability for use with a tire size mix. All of these problems lead to additional efforts and costs in carrying out the tire filling process.

On the other hand, if the tire filling bell is not equipped with a seal ring, the major disadvantage is the substantially higher consumption and waste of pressurized air, because the entire interior space of the wheel rim must be filled with pressurized air during each filling cycle, in the manner as described above.

SUMMARY OF THE INVENTION

In view of the above, it is an object of the invention to provide an apparatus and a method for filling pneumatic tires, which is suitable for use with a broad variety of different wheel models or configurations and wheel sizes, even when such different wheel configurations or wheel sizes are successively to be processed in a mixed operation, in a fully automated tire filling and mounting system. The invention further aims to avoid or overcome the disadvantages of the prior art, and to achieve additional advantages, as apparent from the present specification.

The above objects have been achieved according to the invention in a first embodiment of a tire filling station for filling air into a wheel/tire combination including a tire mounted on a wheel rim. The tire filling station comprises a tire filling bell and a support and seal arrangement that are arranged respectively opposite one another, so as to receive the wheel/tire combination therebetween in a filling position while respectively contacting and cooperating with the side surfaces of the side walls of the tire, as well as a transport apparatus that transports successive wheel/tire combinations to and away from the tire filling station. The support and seal arrangement comprises a multi-part contact or support plate, of which the respective separate parts are movable apart and together with respect to each other, and particularly are arranged sealed against one another for carrying to out the tire filling process. At least one part of the multi-part support plate or the transport apparatus is respectively supported by a lifting device to be movable relative to the other in a direction perpendicular to the transport plane in which the successive wheel/tire combinations are transported by the transport apparatus.

The above objects have further been achieved according to the invention in a second embodiment, or according to a second feature of a tire filling station according to the invention, wherein the tire filling bell comprises at least two filling rings of different diameters, which are especially arranged concentrically and axially slidably relative to each other. Such an arrangement provides a telescoping construction of the filling rings, which is especially compact while still providing a long working range. Such an arrangement also allows adaptability to different size wheel rims by simply selecting the best-fitting one of the available tire filling rings for carrying out the filling operation.

The invention further provides a method for operating the above described tire filling station, as follows. A wheel/tire combination is transported by the transport apparatus to the tire filling station, where the wheel/tire combination is supported between the tire filling bell and the support and seal surface provided by the several parts or separate seal surfaces of the support and seal arrangement. Namely, once the wheel/tire combination has been transported to the tire filling station and supported in its proper position, then the transport apparatus and the wheel/tire combination are moved relatively apart from one another in a direction perpendicular or normal to the transport plane. Thereafter, the plural separate seal surfaces or support parts of the support and seal arrangement are moved together and joined or butted in a tightly sealed manner, while providing a seal against the downwardly facing side wall of the tire. A supply of pressurized air passes through an annular gap between the opposite upwardly facing side wall of the tire and the wheel rim, so as to fill air into the wheel/tire combination. After the complete filling of the wheel/tire combination, the several parts of the support and seal arrangement are moved apart from one another, and then the transport apparatus and the wheel/tire combination are again moved toward each other and brought into contact so that the wheel/tire combination is again supported on the transport apparatus and is then carried away from the tire filling station by the transport apparatus.

According to the second embodiment or second feature of the invention, a respective suitably sized one of the several filling rings making up the filling bell is selected dependent on the respective tire diameter of the wheel/tire combination to be filled. Namely, depending on the diameter of the wheel rim and the tire of the wheel/tire combination being filled, either the larger diameter outer filling ring, or the smaller diameter inner filling ring will be moved axially and downwardly into contact with the side wall of the tire, while the respective other filling ring remains retracted. The selected filling ring of the appropriate diameter protrudes downwardly beyond the other filling ring, so that the appropriate selected filling ring can achieve the necessary seal on the tire sidewall, while the other non-selected filling ring does not interfere with or hinder the filling operation.

The invention for the first time achieves the significant advantage that the range of application and the adaptability of tire filling systems can be significantly increased, especially in filling apparatus that do not use seal rings, in that the dimensions of the support and seal surfaces for the wheel/tire combination and/or the filling bell dimensions can be selected independently of the dimensions of the transport apparatus. In other words, the invention avoids the problem of the prior art, as discussed above, that the possible range of dimensions of the system components that support and seal the wheel/tire combination are limited to fit between clear center passage dimensions of the transport apparatus. This limitation or disadvantage of the prior art is overcome by the invention by providing that the seal surface and/or the filling bell is respectively embodied in a multi-part manner, so that these components can have a diameter that is independent of the configuration and the dimensions of the transport apparatus. In the context of seal-ring-free tire filling, a significant cost savings and process cycle time savings can be achieved also with regard to the known pallet transport systems in which each wheel/tire combination is allocated to its own individual pallet on which it is transported.

A particularly advantageous embodiment of the invention provides that the transport apparatus comprises two transport conveyor devices for supporting and transporting the wheel/tire combination, respectively on two opposite sides of the wheel center axis. Moreover in this embodiment, the support or contact plate of the support and seal arrangement comprises at least one central part or plate member arranged between the two transport devices, and at least one lateral part or plate member that is laterally arranged relative to the central plate member and is laterally movable to contact and seal against the central plate member. This embodiment is structurally simple and economical to manufacture.

A particularly compact construction of the inventive arrangement is achieved when the laterally joinable or sealable part of the support and seal arrangement is movable from an initial position between the two transport devices into the deployed sealed position. With such an arrangement the sliding or tilting movement of the laterally joinable part of the support and seal arrangement in a direction perpendicular to the transport direction is carried out from the inside or center toward the outside, i.e. outwardly.

A further embodiment of the invention provides for two lateral plate members or parts of the support and seal arrangement respectively arranged outwardly next to the two transport devices, whereby these two parts are laterally movable in a direction perpendicular to the transport direction from an initial separated position into the contacting or sealing position in which they are sealed respectively against opposite side edges of the central plate. This embodiment has the advantage that only two seal joints exist between the respective three parts of the support and seal arrangement, and the motion of the two outer parts is a simple sliding motion in a single plane.

In this embodiment, a further advantage is that the slidable outer parts or plates are supported not only on an outer portion thereof, but also on an inner portion thereof. In other words, when these outer plates are in their respective contacting positions sealed against the central plate of the support and seal arrangement, these outer plates bridge or span across an open area in which the respective transport conveyor device is arranged. At the same time, the outer and inner portions or edges of the outer plates are firmly supported, for example on corresponding outer or inner parts of the machine frame. Since the sliding displacement of the outer plates is only carried out when no load is being applied, i.e. in a load-free condition, the enormous air pressure forces arising during the tire filling process can be easily and reliably transmitted into the underlying machine frame or support structure without using costly or complicated slide bearings or the like for supporting the movable outer plates.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
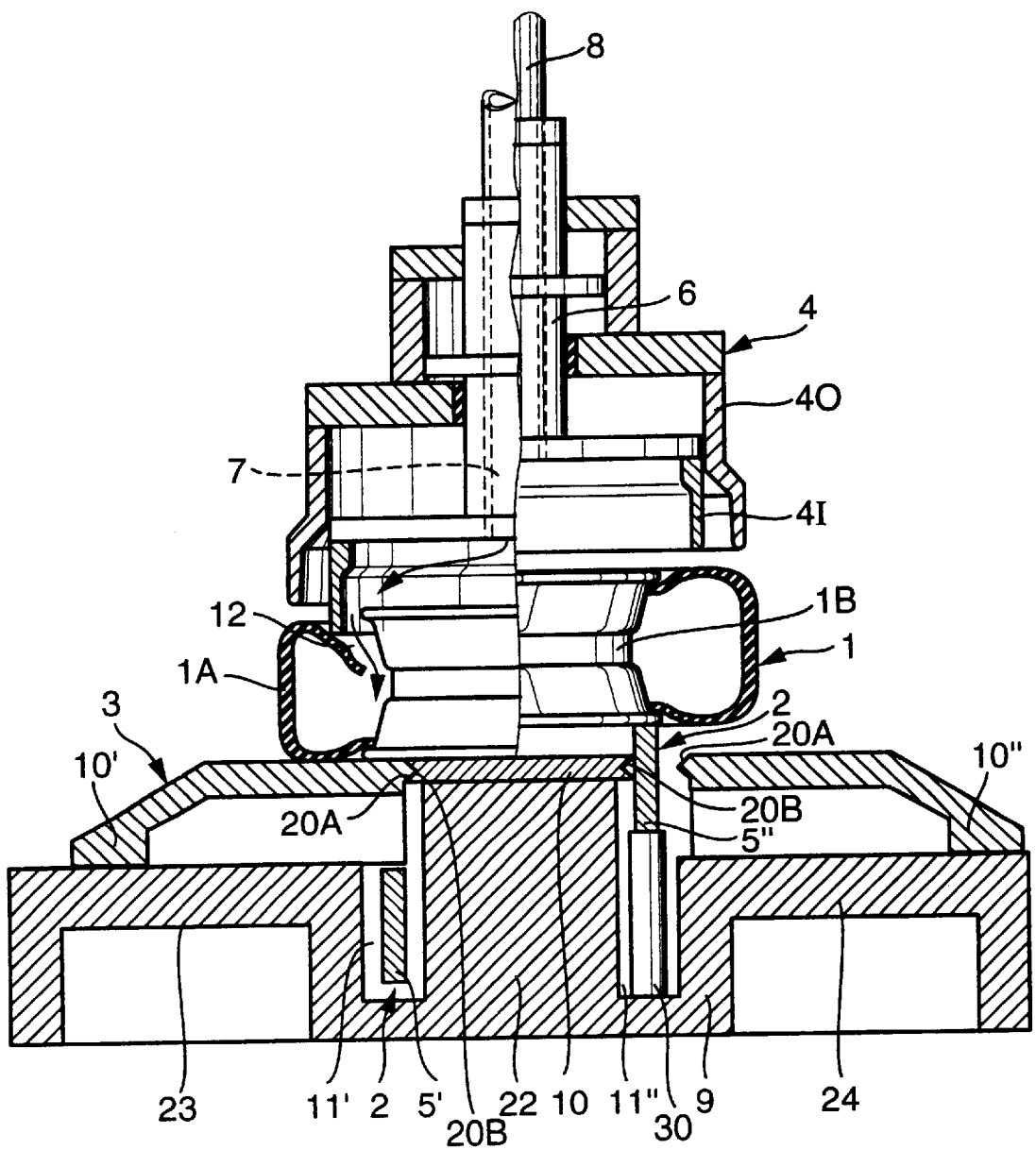
FIG. 1 is a schematic sectional view of a first embodiment of a tire filling station according to the invention, in which the left half of the illustration shows the position of the components in a tire filling phase, and the right half of the illustration shows the positions of the components in a transport phase.

A tire 1A is loosely mounted on a wheel rim 1B in a tire mounting station (not shown) in any conventionally known manner, to form thereof a wheel/tire combination 1, which is then transported in the non-pressurized state, by means of the transport apparatus 2, from the tire mounting station to the tire filling station shown in FIG. 1. There, the wheel/tire combination 1 is then supported on a support and seal arrangement 3 of the filling station. The filling station further includes a tire filling bell or dome 4 through which pressurized air is provided to fill the tire. After the tire has been inflated, the transport apparatus 2 further transports the filled wheel/tire combination 1 away from the tire filling station to a subsequent unbalance measuring or balancing station. These stations can be respectively embodied as individual modules or separate stations that each respectively comprise a separate or individual machine frame. Alternatively, a single common machine frame can be provided for various stations, which thereby form an integrated tire mounting and filling system.

Figure 3:
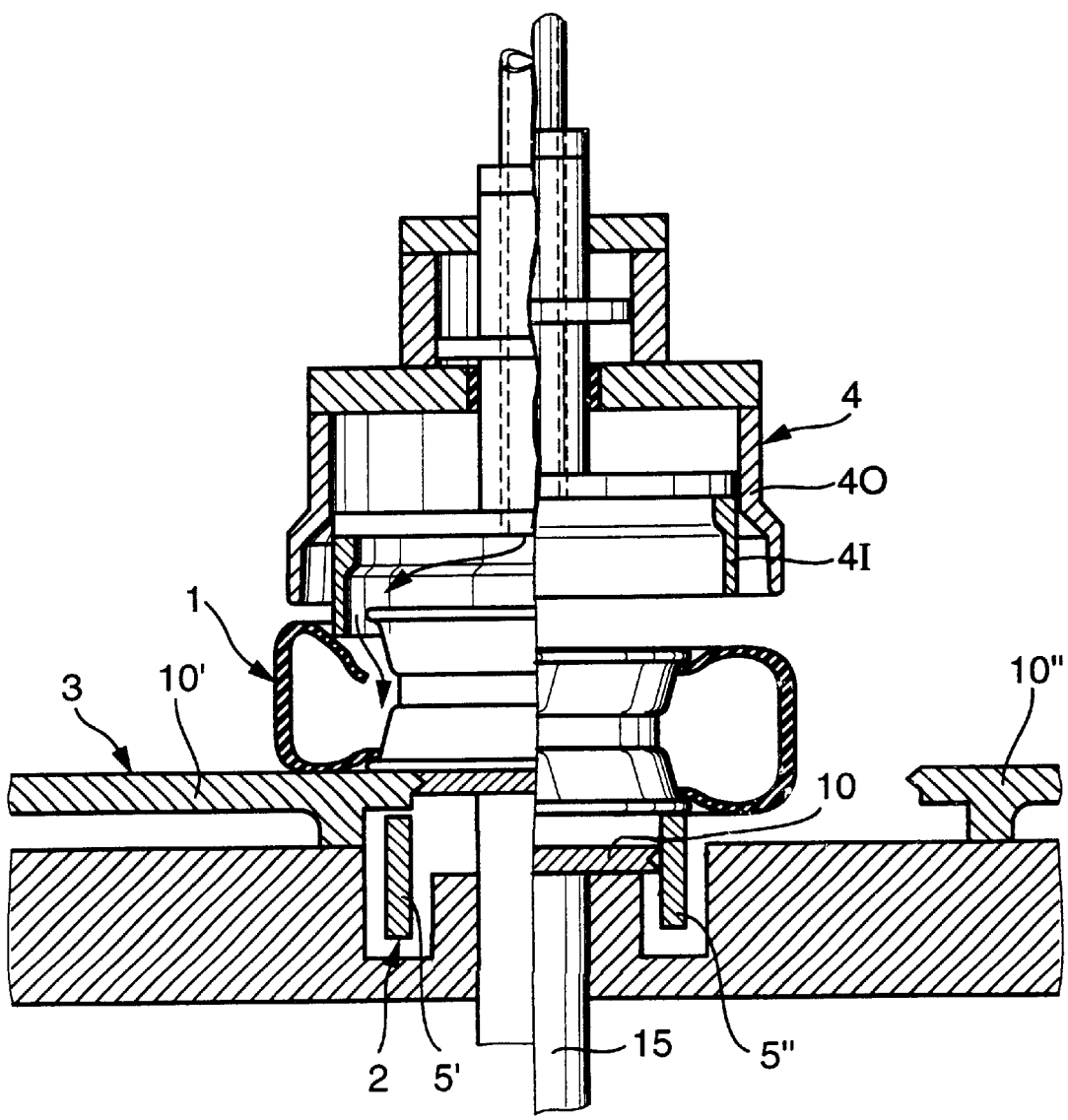
FIG. 3 is a schematic sectional view of another embodiment of a tire filling station according to the invention, whereby the left half of the illustration shows a tire filling phase, and the right half of the illustration shows a tire transport phase.

The respective tire filling stations shown in FIG. 1 and FIG. 3 are illustrated in section, whereby the two halves of each sectional view respectively show two different process phases.

Namely, the right half of each illustration shows the transport phase in which the wheel/tire combination is being transported, while the left half of each illustration shows the tire filling or inflating phase.

The transport apparatus 2 comprises two transport conveyor devices 5' and 5" that respectively run along a horizontal transport plane in a transport direction, and respectively spaced apart from one another perpendicular to the transport direction. The two transport conveyor devices 5' and 5" may, for example, be embodied as conveyor chains or conveyor belts, or lift-stroke step conveyors, which are respectively supported on a machine frame 9. These transport conveyor devices 5' and 5" respectively run on the two opposite sides of the rotation axis of the wheel/tire combination 1, whereby this axis extends vertically and normal to the transport plane. In other words, the wheel/tire arrangement 1 is lying on its side as it is transported and handled in the filling process.

During the transport phase as shown in the right half of FIG. 1, the wheel/tire combination 1 is resting and supported by diametrically opposed portions of the wheel rim side surfaces on the two respective transport conveyor devices 5' and 5". Alternatively, it could be provided that the wheel/tire combination 1 is supported with diametrically opposed areas of the tire side walls resting on the two transport conveyor devices 5' and 5". The transport conveyor devices 5' and 5" carry out a lifting step conveying process, whereby successive wheel/tire combinations 1 are conveyed stepwise in a forward transport direction, while simultaneously being successively lifted and lowered. Namely, a respective wheel/tire combination 1 is lifted up and transported into the tire filling station until it is located centrally under the tire filling bell 4. Then, the transport apparatus 2 is lowered, so as to lower the wheel/tire combination 1 onto the central plate-shaped part 10 of the support and seal arrangement 3. The transport apparatus 2, i.e. the two transport conveyor devices 5' and 5", are lowered down until they are completely recessed in respective receiver recesses 11' and 11" of the machine frame 9, while the wheel/tire combination is fully supported on the central plate-shaped part 10 of the support and seal arrangement 3. For this motion of the transport conveyor devices 5' and 5", they are respectively carried by a lifting device 30, such as a piston-cylinder device or other actuator as merely schematically shown in the right half of FIG. 1.

It should further be understood that the central part 10 of the support and seal arrangement 3 may either be shaped with a protruding hump, or an appropriately formed member may be arranged on top of the central part 10, so as to substantially fill out the cup-shaped or bowl-shaped space within the wheel rim supported on the support and seal arrangement 3. Such an arrangement provides for the effective centering and locating of the wheel rim on the central plate-shaped part 10, and also fills out much of the dead air space that would otherwise have to be filled with pressurized air during the filling process, as will be described below. Nonetheless, in the simplest embodiment, the central part 10 is simply a flat plate member.

In the present embodiment, the central plate-shaped part 10 is rigidly and fixedly supported on the machine frame 9. In one configuration, the central plate-shaped part 10 can be elongated in the transport direction, so that it extends with a dimension in the transport direction that is larger than the diameter of the support or contact surface of the largest wheel/tire combination 1 that is to be filled using this filling station. In this manner, a stable and solid support of all expected wheel/tire combinations 1 is achieved on: the central part 10. Also, the Joints relative to the two lateral plate members 10' and 10" (described next) are simple straight lines. Alternatively, the central plate member 10 can be a circular disk, while the lateral plate members 10' and 10" are respective annular or segment-shaped plates.

The support and seal arrangement 3 further comprises two additional plate-shaped parts 10' and 10" that are arranged laterally on both respective sides of the motion path of the transport apparatus 2 during the transport phase, as shown in the right half of FIG. 1. In other words, these lateral parts 10' and 10" are arranged laterally outwardly during the transport phase in order to provide the required clearance for the transport apparatus 2. After the transport apparatus 2 has been lowered into the receiver recesses 11' and 11" and the wheel/tire combination I has been deposited onto the central part 10, then the two lateral parts 10' and 10' are moved inwardly toward one another and toward the central part 10 by sliding in the support plane in a direction perpendicular to the transport direction, while being slidingly supported on the machine frame 9. Thereby, the lateral parts 10' and 100 slide over the receiver recesses 11' and 11" in which the lowered transport devices 5' and 5" have been recessed, until the two lateral parts 10' and 10" are slidingly pushed against mating edges of the central part 10. This sealed contacting position of the parts 10, 10' and 10" is shown in the left half of FIG. 1.

The adjoining parts 10, 10' and 10" of the support and seal arrangement 3 are provided with respective seal devices along their mating edges. In the illustrated embodiment, these seal devices are in the form of respectively mating or coordinating seal protrusions or lips 20A and seal recesses or grooves 20B, that sealingly mate with each other. Alternatively, elastic seal members such as seal beads or the like can be provided, for example being received in corresponding grooves along the edges of the parts 10' and 10".

The two lateral parts 10' and 10" preferably have a rectangular shape in a plan view, just as the central part 10, and preferably have the same lengthwise extension dimension along the transport direction as the central part 10. Alternatively, however, the support and seal arrangement 3 can have a top plan view configuration in the form of a circle, whereby the two lateral parts 10' and 10" have respective circular segment shapes or annular arcsegment shapes as mentioned above. In any event, the dimension of the support and seal arrangement 3 in the support plane perpendicular to the transport direction is greater than the diameter of the contact or support surface of the largest wheel/tire combination 1 that is to be filled using the filling station.

As a further alternative embodiment, which is not shown, the support and seal arrangement 3 may comprise only a single lateral part in addition to the central part, whereby the central part would also be arranged to be slidable in the support plane. In this context, the lateral part would be slidingly pushed against the central part 10 in a direction perpendicular to the transport direction, and then the two parts would be slidingly moved in unison together until the seal joint therebetween comes to a position centrally between the two transport conveyor devices 5' and 5".

A further embodiment, which is not shown, does not provide the above described lateral part 10' and 10" that are purely horizontally slidable in a fixed horizontal plane. Instead, this embodiment provides parts that initially lie between the two transport conveyor devices 5' and 5" during the transport phase, and are then laterally outwardly slidingly displaced and moved vertically or tilted into the support plane in order to form a planar seal surface. A tilting motion rather than the sliding displacement of these parts out of the central area when forming the support surface for use in the tire filling phase, is also within the scope of the invention.

The tire filling bell 4 shown in FIG. 1 is embodied in a multi-part manner, comprising a first inner bell including a first tire filling ring 4I and a first bell end closing one circular end of the first tire filling ring, and a second outer bell including a second tire filling ring 4O and a second bell end closing one circular end of the second tire filling ring. The two tire filling rings 4O and 4I have different diameters and are arranged axially slidably with respect to each other, in the present embodiment. Namely, the inner ring 4I is telescopable or axially slidable concentrically within the outer ring 4O. Depending on the diameter of the wheel/tire combination 1 that is to be filled, the more suitably sized one of the rings 4O and 4I is extended to protrude downward so that the lower free edge thereof presses against the tire sidewall so as to press this tire sidewall downwardly away from the wheel rim 1B to form an annular gap or space 12 between the bead of the tire 1A and the wheel rim 1B, as shown in the left half of FIG. 1. Pressurized air is filled into the tire through this annular gap 12 as indicated by the air flow arrows in FIG. 1. The first inner bell defines an inner bell chamber inside the first tire filling ring, which is separate from an outer space outside of the first inner bell and inside of the second outer bell when the first inner tire filling ring 4I is sealed against the sidewall of the tire 1A (FIGS. 1 and 3).

To carry out the above described motion of the tire filling bell 4 relative to the wheel/tire combination 1, and of the tire filling rings 4O and 4I relative to each other, the bell 4 and the rings 4O and 4I are preferably movable by fluid actuation, e.g. by pneumatic or hydraulic pressure applied to appropriate actuating piston-cylinder devices, in any arrangement known to persons skilled in the art. Particularly, in the illustrated example embodiment, the right half of FIG. 1 shows the tire filling bell 4 in its raised position during the transport phase, whereby the lower free edges of the two tire filling rings 4O and 4I are both at approximately the same height. From this initial position, the tire filling bell 4 is lowered into the tire filling position shown in the left half of FIG. 1, whereby the inner tire filling ring 4I has been slidingly moved further downward relative to the outer tire filling ring 4O. To achieve this, the inner tire filling ring 4I is connected to and carried by a piston-cylinder device 6, which is linearly actuatable or slidable by an appropriate pressurizing fluid. On the other hand, the outer tire filling ring 4A is connected to a concentrically arranged housing in which the piston-cylinder device 6 is concentrically slidably arranged.

In the illustrated embodiment, the supply of pressurized air for filling the tire is provided from a pressurized air source, such as a compressor or a compressed air reservoir tank, through an airline 8 into a central bore 7 provided in the piston-cylinder device 6, and then through the bore 7 into the space confined within the tire filling bell 4, and from there into the inner space of the tire through the annular gap 12, as shown by the arrows in FIG. 1 and described generally above. Alternatively, the pressurized air for filling the tire could be provided laterally through the side of the tire filling bell 4 through a suitable air supply coupling, or from below, i.e. through one or more air supply holes through the bottom seal surface.

In the tire filling position shown in the left half of FIG. 1, a continuous closed seal surface is formed by the respective parts 10, 10' and 10" of the support and seal arrangement 3, which have been sealingly pressed into contact with one another. The wheel/tire combination 1 is lying on its side, whereby the sidewall of the tire 1A is in sealing contact with the continuous seal surface formed by the abutting parts 10, 10' and 10". The lower free edge of the inner tire filling ring 4I is sealed and pressed against the upper sidewall of the tire 1A so as to press this sidewall away from the wheel rim 1B. The supply of pressurized air is provided through the central bore 7 as described above. In this condition, the inner bell chamber of the inner tire filling bell (i.e. inside the inner ring 4I), the inner space of the tire 1A, and the seal surfaces of the parts 10, 10' and 10" of the support and seal arrangement 3 form a closed or sealed space relative to the surrounding environment and relative to the outer space outside of the inner bell (ring 4I), yet inside of the outer bell (ring 4O). sidewall of the tire 1A is in sealing contact with the continuous seal surface formed by the abutting parts 10, 10' and 10". The lower free edge of the inner tire filling ring 4I is sealed and pressed against the upper sidewall of the tire 1A so as to press this sidewall away from the wheel rim 1B. The supply of pressurized air is provided through the central bore 7 as described above. In this condition, the inner space of the tire filling bell 4, the inner space of the tire 1A, and the seal surfaces of the parts 10, 10' and 10" of the support and seal arrangement 3 form a closed or sealed space relative to the surrounding environment.

During the course of the tire filling process, the air pressure within the inner space of the tire 1A builds up, and the increasing pressure pushes the upper side wall of the tire 1A upwardly against the force applied by the inner tire filling ring 4I until the bead of the tire 1A contacts and seals against the edge horn or lip of the wheel rim 1B. During this process, the inner tire filling ring 4I retracts upwardly in a cushioning or counter-acting manner as the tire sidewall moves toward the edge lip of the wheel rim. Finally, the entire tire filling bell 4 is retracted into its initial position as shown in the right half of FIG. 1.

Then, the lateral parts 10' and 10" of the support and seal arrangement 3 are moved laterally apart from each other and away from the central part 10, which opens two spaces for accommodating the transport conveyor devices 5' and 5". Then, the transport apparatus 2, i.e. including the conveyor devices 5' and 5". is lifted or raised up by the lifting device 30, so that the filled wheel/tire combination 1 is lifted and supported on the two transport conveyor devices 5' and 5" as shown in the right half of FIG. 1, and is then transported out of the tire filling station.

While FIG. 1 illustrates an embodiment of the invention including both a multi-part support and seal arrangement 3 and a multi-part tire filling bell 4, it is also within the scope of the invention to provide only one of these multi-part structures in a tire filling station, while the respective other structure is conventional. For example, a tire filling station could have a multi-part support and seal arrangement 3, with a one-part tire filling bell 4, or a tire filling station could have the inventive multi-part tire filling bell with a one-part support and seal arrangement. In the latter case, for example, the wheel/tire combination can be manually placed onto and removed from the one-part support and seal platform, rather than using an automated transport apparatus.

Figure 2:
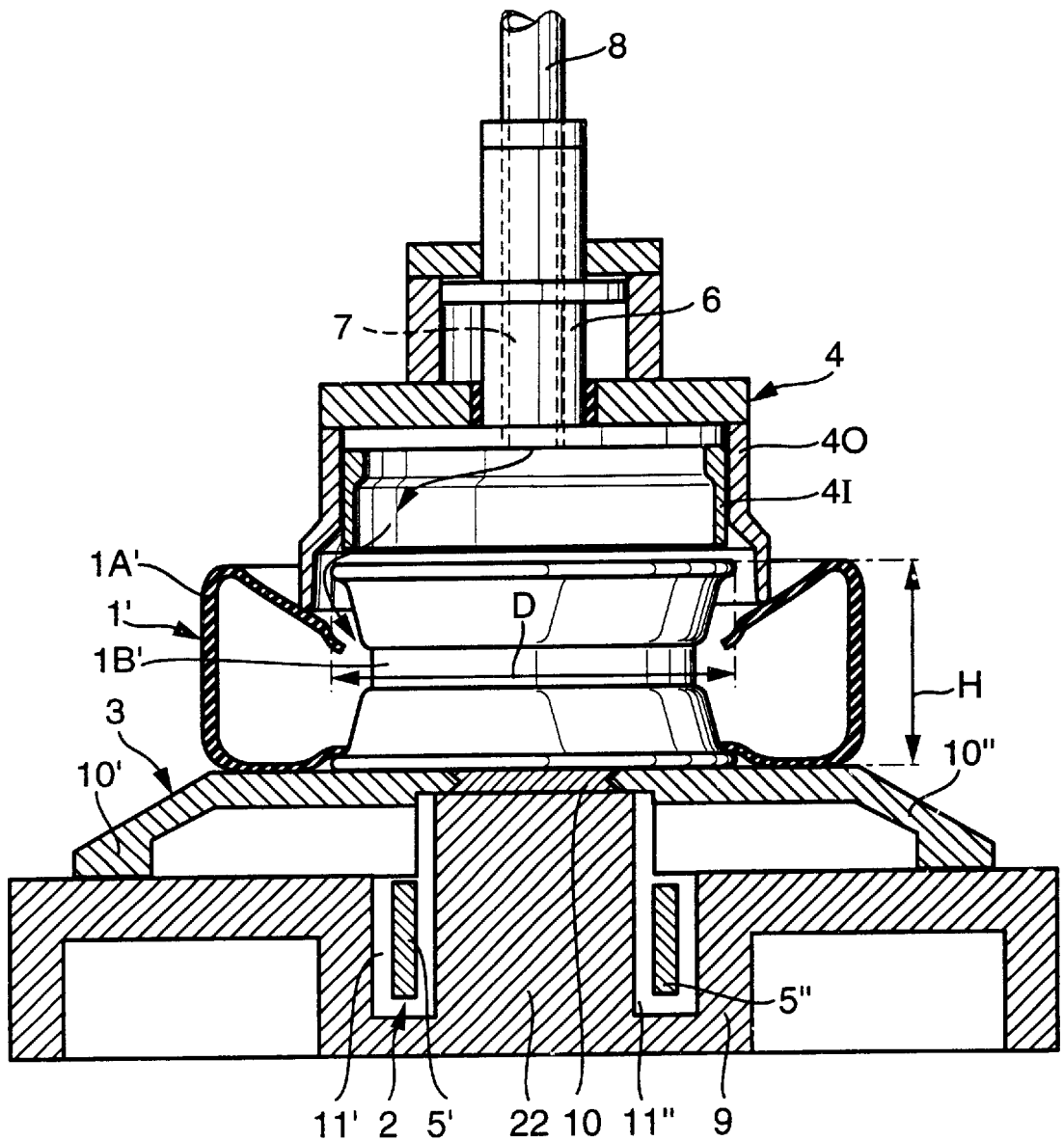
FIG. 2 is a schematic sectional view of the inventive tire filling station generally according to FIG. 1, but showing a tire filling process being carried out on a wheel/tire combination of a larger diameter than that shown in FIG. 1.

The tire filling station according to the invention as shown in FIG. 2 generally corresponds to the tire filling station of FIG. 1, except for the difference to be described below. A redundant description of the same components, which are labelled with the same reference numbers as in FIG. 1 will be omitted. In the simple embodiment of FIG. 1, the central vertical support column 22 of the machine frame 9 supports only the central part 10 of the support and seal arrangement 3. Namely, the laterally outer parts 10' and 10" of the support and seal arrangement 3 are supported only on the laterally outer portions 23 and 24 of the machine frame 9. In view of the support provided around the entire outer edge or rim of the parts 10' and 10", this is sufficient support for many applications, but when high loads, i.e. high downward pressing forces, are expected to be applied to the wheel/tire combination 1 during the filling process, e.g. for large-size high-pressure tires, it can be advantageous to provide additional support for the inner edge of the outer parts 10' and 10".

In this regard, in FIG. 2, the central part 10 is relatively smaller or narrower (or preferably the central support column 22 is wider) than in FIG. 1. The outer parts 10' and 10" extend closer to the central axis to sealingly contact and mate with the central part 10. In this arrangement, the inwardly directed edges of the laterally outer parts 10' and 10" are supported on the central vertical support column 22 together with the central part 10. Thereby, the inventive embodiment provides a sturdy rigid support for the high loads that arise during the filling operation. With this arrangement, the parts 10' and 10" can be dimensioned somewhat thinner and lighter than in the embodiment of FIG. 1, in view of the additional support provided to the inner edges of the parts 10' and 10" by the central vertical support column 22 when the parts 10' and 10" are in their working or contacting positions.

The major difference between FIG. 1 and FIG. 2 is not a difference in the tire filling station, but rather a difference of the wheel/tire combination being filled, to illustrate the adaptability of the inventive tire filling station. Namely, in FIG. 1 a significantly smaller wheel/tire combination 1, such as a thirteen inch wheel, is being filled, while in FIG. 2 a significantly larger wheel/tire combination 1', such as an eighteen inch wheel, is being filled. FIG. 2 illustrates the tire filling position, in which the larger diameter, outer tire filling ring 4O has been pressed against the sidewall of the larger tire 1A' so as to form an annular gap by pressing the side wall away from the wheel rim 1B'.

Due to the larger diameter D and the greater wheel rim width H of the wheel-tire combination 1' of FIG. 2 in comparison to the wheel/tire combination 1 of FIG. 1, the smaller inner tire filling ring 4I would not be suitable for carrying out the tire filling process. Thus, the inner tire filling ring 4I is retracted upwardly into the inner space of the outer tire filling ring 4O by an appropriate fluid actuation of the piston-cylinder device 6, so that the inner ring 4I does not contact the wheel/tire combination 1' and does not hinder or impede the filling operation and particularly the supply of pressurized air from the central bore 7 in the piston-cylinder device 6 into the interior space of the tire. It is further apparent in FIG. 2 that the support and seal arrangement 3 made up of the parts 10, 10' and 10" has dimensions large enough so that large wheel/tire combinations 1', for example large tires 1A' mounted on eighteen inch wheels can be fully supported and sealed on the support and seal arrangement 3, just as well as the smaller wheel/tire combinations 1 as shown in FIG. 1.

It should be understood that exactly the same tire filling station as shown in FIG. 1 can be used adaptably for the small wheels as shown in FIG. 1 and for the large wheels as shown in FIG. 2.

FIG. 3 shows a further embodiment of the tire filling station according to the invention, whereby the left half of FIG. 3 shows the filling position, and the right half of FIG. 3 shows the transport position. In this embodiment, the transport apparatus 2 always remains at the same elevation, i.e. the transport apparatus 2 does not rise up and sink down in order to alternately transport and set down the wheel/tire combination 1 for the filling operation. Instead, the wheel/tire combination 1 is lifted up from or deposited down onto the two transport conveyor devices 5' and 5" of the transport apparatus 2.

This is achieved in that the central part 10 of the support and seal arrangement 3 is carried on a lifting device such as a piston 15 (as an alternative to the lifting device 30 of the transport apparatus 2, as described above). Thereby, the wheel/tire combination 1 can be selectively supported and lifted up on the central part 10 for carrying out the filling operation, or lowered down by lowering the piston 15 until the wheel/tire combination comes to rest on the transport conveyor devices 5' and 5" for carrying out the transport phase.

As shown in the left half of FIG. 3, the wheel/tire combination 1 is lifted up on the central part 10 by raising the piston 15, and then the lateral parts 10' and 10" are moved laterally inwardly to sealingly contact and join the central part 10 and thereby form the continuous sealed surface of the support and seal arrangement 3. The entire filling operation is then carried out in the same manner as described above in connection with FIG. 1.

On the other hand, as shown in the right half of FIG. 3, once the filling operation is completed, the lateral parts 10' and 10" are retracted laterally outwardly to provide clearance for the wheel/tire combination 1, which is then lowered down onto the transport conveyor devices 5' and 5" by lowering the piston 15. All other aspects of the tire filling station according to FIG. 3 correspond to those of the tire filling station of FIG. 1, and a redundant description is omitted here.

As mentioned above, a properly formed insert block can be provided on the central part 10 of the support and seal arrangement 3. Such an insert block is not shown in the drawings for the sake of simplicity and clarity. This insert block may be a separate component, or an integral protrusion of the central part 10 itself. The centering insert block preferably cooperates with a hole or opening in the wheel rim, for the purpose of proper centered receiving of the wheel/tire combination on the support and seal arrangement 3. Also, the centering insert block fills out at least a portion of what would otherwise be dead air space in the dished portion of the wheel rim, and thereby reduces the consumption of pressurized air during the tire filling process.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A tire filling station adapted to fill air into a wheel-tire combination including a tire mounted on a wheel rim, said tire filling station comprising:
   a support and seal arrangement including a support and seal surface adapted to support and seal against a first side surface of the wheel-tire combination, wherein said support and seal arrangement is a multi-part seal arrangement comprising at least first and second plate members, which are selectively relatively movable apart from one another with a first gap therebetween in a separated state, and which are selectively relatively movable together to sealingly contact one another in a contacting state and thereby form said support and seal surface as an uninterrupted sealed surface;
   a tire filling bell arranged opposite and facing said support and seal surface so as to receive the wheel-tire combination in a filling position between said tire filling bell and said support and seal surface, wherein said tire filling bell is adapted to press and seal against a second side surface of the tire opposite the first side surface;
   a transport apparatus adapted to support and transport the wheel-tire combination along a transport plane selectively to and away from the filling position; and
   a lifting device that supports and is adapted to selectively lift at least one of said first plate member and said transport apparatus relative to each other in a lifting direction that has at least a direction component perpendicular to said transport plane.

2. The tire filling station according to claim 1, wherein:
   said tire filling bell and said support and seal arrangement are both arranged coaxially along a common center axis,
   the wheel-tire combination is adapted to be positioned in the filling position so that a wheel axis thereof is aligned with said common center axis,
   said transport apparatus comprises two transport conveyor devices that are arranged spaced apart from one another on opposite sides of said common center axis and that are adapted to selectively support and transport the wheel-tire combination thereon,
   said first plate member is a central plate member arranged centrally on said common center axis between said two transport conveyor devices, and
   said second plate member is arranged to be positioned in a lateral position next to said central plate member and to laterally sealingly contact said central plate member in said contacting state.

3. The tire filling station according to claim 2, wherein said second plate member is selectively movable between said lateral position in said contacting state and a retracted position between said two transport conveyor devices in said separated state.

4. The tire filling station according to claim 2, wherein said multi-part seal arrangement further comprises a third plate member arranged laterally next to and sealingly contacting said central plate member on a side thereof opposite said second plate member in said contacting state.

5. The tire filling station according to claim 4, wherein said second and third plate members are each laterally slidable relative to said central plate member between respective positions in said separated state and said contacting state.

6. The tire filling station according to claim 5, wherein said first gap between said second plate member and said central plate member in said separated state provides a space that accommodates a first one of said two transport conveyor devices therein, wherein a second gap is formed between said third plate member and said central plate member in said separated state, and wherein said second gap provides a space that accommodates a second one of said two transport conveyor devices therein.

7. The tire filling station according to claim 1, wherein said lifting device supports and is adapted to selectively lift said transport apparatus relative to said first plate member.

8. The tire filling station according to claim 1, wherein said lifting device supports and is adapted to selectively lift said first plate member relative to said transport apparatus.

9. The tire filling station according to claim 1, wherein said multi-part seal arrangement further comprises seal members arranged along respective opposite adjoining contact edges of said plate members.

10. The tire filling station according to claim 1, wherein said tire filling bell comprises at least first and second tire filling rings that respectively have different diameters.

11. The tire filling station according to claim 10, wherein said first and second tire filling rings are respectively inner and outer rings arranged coaxially and axially slidable relative to each other.

12. A method of using the tire filling station according to claim 1 for filling air into the wheel-tire combination, comprising the following steps:
   a) transporting said wheel-tire combination on said transport apparatus into said filling position;
   b) in said filling position, supporting said wheel-tire combination on said first plate member, and operating said lifting device to move said first plate member and said transport apparatus relatively away from each other in a direction having at least a direction component perpendicular to said transport plane;
   c) after said step b), moving said at least first and second plate members from said separated state to said contacting state to thereby form from said plate members said support and seal surface as said uninterrupted sealed surface;
   d) supporting and sealing said first side surface of said wheel-tire combination on said uninterrupted sealed surface;
   e) moving at least one of said tire filling bell and said support and seal surface relative to each other so as to press said tire filling bell and said second side surface of said tire against each other and open an annular gap between said tire and said wheel rim;
   f) filling air into said tire through said annular gap;
   g) after completion of said step f), moving said plate members apart from one another from said contacting state into said separated state, and then operating said lifting device opposite said step b) so as to bring said transport apparatus into contact with said wheel-tire combination; and
   h) after said step g), supporting said wheel-tire combination on said transport apparatus and transporting said wheel-tire combination on said transport apparatus away from said filling position.

13. The method according to claim 12, wherein said operating of said lifting device in said steps b) and g) comprises moving said transport apparatus down and up relative to a fixed machine frame of said station and relative to a fixed plane on which said plate members are arranged.

14. The method according to claim 12, wherein said operating of said lifting device in said steps b) and g) comprises moving said first plate member up and down relative to a fixed machine frame of said station and relative to a fixed plane on which said transport apparatus is arranged.

15. The method according to claim 12, wherein said tire filling bell comprises at least first and second tire filling rings that respectively have different diameters, and wherein said step e) comprises selecting one of said first and second tire filling rings dependent on a diameter of said wheel-tire combination, and moving and pressing said selected one of said tire filling rings against said second side surface of said tire.

16. A tire mounting or wheel balancing system comprising said tire filling station according to claim 1, and at least one further measuring or processing station arranged adjacent to said transport apparatus.

17. A tire filling station adapted to fill air into a wheel-tire combination including a tire mounted on a wheel rim, said tire filling station comprising:
   a pressurized air supply line adapted to supply pressurized air;
   a support-and seal arrangement including a support and seal surface adapted to support and seal against a first side surface of the wheel-tire combination; and
   a tire filling bell arranged opposite and facing said support and seal surface so as to receive the wheel-tire combination in a filling position between said tire filling bell and said support and seal surface;
   wherein said tire filling bell comprises a first inner bell including a first tire filling ring and a first bell end that closes one circular end of said first tire filling ring to define an inner bell chamber inside said first tire filling ring, and a second outer bell including a second tire filling ring and a second bell end that closes one circular end of said second tire filling ring;
   wherein said first tire filling ring has a smaller diameter than said second tire filling ring, and said first and second tire filling rings are arranged coaxial and axially slidable relative to each other along a central axis;
   wherein said first and second tire filling rings are each selectively movable relatively toward said support and seal surface to selectively press and seal against a second side surface of the tire opposite the first side surface; and
   wherein said pressurized air supply line is connected to said first inner bell and said inner bell chamber is enclosed relative to an outer space outside of said first inner bell and inside of said second outer bell when said first tire filling ring is sealed against the second side surface of the tire, so that the pressurized air supplied from said pressurized air supply line enters directly into said inner bell chamber without entering said outer space when said first tire filling ring is sealed against the second side surface of the tire.

18. The tire filling station according to claim 17, further comprising an actuator device connected to said first bell end and to said second bell end coaxially along said central axis and adapted to selectively move said first inner bell and said second outer bell relative to one another along said central axis, and wherein said pressurized air supply line communicates through a hole in said first bell end into said inner bell chamber.

19. The tire filling station according to claim 17, expressly excluding the use of a separate seal ring between said tire filling bell and the tire.

20. A method of using the tire filling station according to claim 17 for filling air into the wheel-tire combination, comprising the following steps:
   a) placing said wheel-tire combination into said filling position, and supporting said first side surface thereof on said support and seal surface;
   b) selecting a respective one of said tire filling rings that has a diameter larger than an outer diameter of said wheel rim and within a diameter range of a sidewall of said tire, and moving said selected one of said tire filling rings toward said support and seal surface to press against said second side surface of said tire and open an annular gap between said tire and said wheel rim;
   c) filling pressurized air from said pressurized air supply line through said tire filling bell into said tire through said gap; and
   d) moving said selected one of said tire filling rings away from said support and seal surface to move out of contact with said second side surface of said tire.

21. A combination comprising said tire filling station according to claim 17, at least one further measuring or processing station, and a transport apparatus linking said stations to one another so as to form thereof a tire mounting or wheel balancing system.

* * * * *

UNITED STATES PATENT AND TRADEMARK OFFICE
CERTIFICATE OF CORRECTION

PATENT NO. : 6,467,524 B2
DATED : October 22, 2002
INVENTOR(S) : Ronge et al.

It is certified that error appears in the above-identified patent and that said Letters Patent is hereby corrected as shown below:

<u>Title page, Item [54] and Column 1, line 1,</u>
After "TIRE", replace "FILING" by -- FILLING --;

<u>Title page,</u>
Item [75], Inventors, after "Rogalla;", replace "Eberstadt" by
-- Darmstadt-Eberstadt --.

<u>Column 3,</u>
Line 8, after "carrying", delete "to".

<u>Column 6,</u>
Line 57, after "on", delete -- : --;
Line 58, before "relative", replace "Joints" by -- joints --.

<u>Column 7,</u>
Line 5, after "combination", replace "I" by -- 1 --;
Line 10, after "and", replace "100" by -- 10" --;
Line 33, after "annular", replace "arcsegment" by -- arc-segment --.

<u>Column 9,</u>
Lines 7 to 17, delete these entire lines.

Signed and Sealed this

Eighteenth Day of February, 2003

JAMES E. ROGAN
*Director of the United States Patent and Trademark Office*